G. Meader.
Vibrating Propeller.
No. 39,738. Patented Sept. 1, 1863.
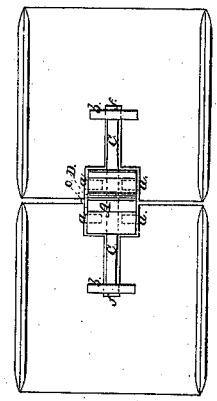
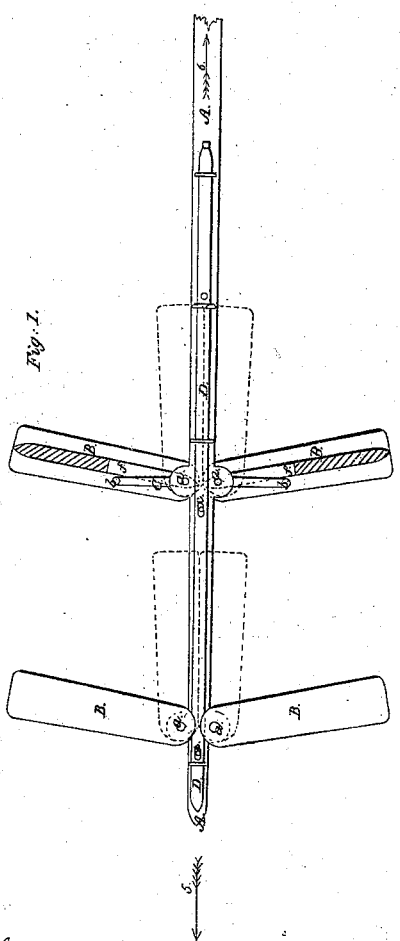
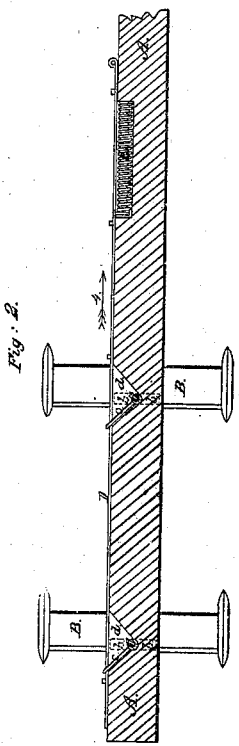
Witnesses,
J. W. Coombs
Inventor,
G. Meader
per Munn & Co.
Attorneys

UNITED STATES PATENT OFFICE.

GEORGE MEADER, OF OTTAWA, ILLINOIS.

IMPROVED DUCK'S-FOOT PROPELLER.

Specification forming part of Letters Patent No. 39,738, dated September 1, 1863.

*To all whom it may concern:*

Be it known that I, GEORGE MEADER, of Ottawa, in the county of La Salle and State of Illinois, have invented a new and useful Improvement in Duck's-Foot Propellers; and I do hereby declare that the following is a full, clear, and exact description of the same, reference being had to the accompanying drawings, forming part of this specification, in which—

Figure 1 is a plan of a propeller with my improvement, representing two of the paddles in section. Fig. 2 is a central longitudinal vertical section of the same. Fig. 3 is a front view of the same.

Similar letters of reference indicate corresponding parts in the several figures.

This invention consists in certain means of reversing the action of a duck's-foot propeller for the purpose of backing or turning the vessel to which it is applied, without reversing or stopping the engine.

To enable others skilled in the art to make and use my invention, I will proceed to describe its construction and operation.

A is the reciprocating bar, which carries the paddles B B, arranged to work either through the stem of the vessel or in suitable guides at the sides thereof or in such other position relatively to the vessel as may be considered desirable. The paddles B B are arranged in pairs, and attached to the sides of the rod by pivots or hinge-joints A A in such manner as to permit them to spread out in the manner shown in black outline in Fig. 1, or assume a position parallel with and close to the bar A, as shown in red outline in the same figure. C C are stops attached to the shaft to form bearings for the paddles when they are spread and in action. These stops consist of short shafts, one for each pair of paddles, passing transversely through the bar A, and having T-shaped ends *b b*. These shafts are each furnished with an arm, *c*, which works through an opening, *d*, in the top of the bar, and the several arms *c c* are all connected with a rod, D, which is fitted to slide in guides on the top of the bar A, and which has applied to it a spring, *e*, which tends to hold the said bar in such a position as to make it keep the shafts C C, with their T-shaped heads, upright, as shown in Fig. 3, and so make the said heads stand across slots *f f*, which are provided in the paddles B B, the said slots being parallel with the shafts C C. By drawing the rod D in the direction of the arrow 4, (shown near it in Fig. 2,) in opposition to the action of the spring *e*, it is caused so to act upon the arms *c c* as to produce a quarter of a revolution of the shafts C, and bring the T-shaped ends *b b* thereof to a horizontal position, which will permit them to enter and pass through the slots *f f*, and by letting go of the said rod again the spring is permitted to draw back arms *c c* and return the T-shaped ends of the slots to the vertical position shown in Fig. 3, which prevents them from passing through the slots *f f*. Any further movement of the shafts than is above described is prevented by the arms *c c* coming in contact with the ends of the openings *d d* in the bar A, which are only just long enough to permit such movement. The reversal of the action of the propeller is effected without stopping the engine by drawing the rod D to such a position as to present the T-shaped ends *b b* of the stops C C in a horizontal position to allow them to pass through the slots *f f* from one to the other side of the paddles, and then allowing the spring *e* to turn back the said stops and bring their heads *b b* across the slots *f f*. With the stops in the position shown in Fig. 1, the paddles are free to fold up against the bar A in the direction indicated by the red outlines, but not in the opposite direction, and the consequence is that by the reciprocating movement of the propeller the vessel will be propelled in the direction of the arrow 5, shown in Fig. 1; but by pulling the rod D, to turn the stops C C, to bring their heads in a vertical position, the first movement of the propeller in the direction of the arrow 6 in Fig. 1, causes the paddles to pass over the stops, which pass through the slots *f f*, and by then letting go of the rod D the spring *e* is caused to turn back the stops and prevent them from returning through the slots *f f*, and the paddles will now only fold in the opposite direction to that indicated by the red outlines in Fig. 1, and will propel the vessel in the opposite direction to that of the arrow 5, before referred to.

When these propellers are used at the sides of a vessel the reversal of the propeller on one side will enable the vessel to be turned completely round upon it own center without touching the engines; and in this consists a very important advantage of my invention.

What I claim as my invention, and desire to secure by Letters Patent, is—

The combination of the movable stops C C, the slots $f f$ in the paddles, the rod D, and the spring $e$, or its equivalent, substantially as herein specified.

GEO. MEADER.

Witnesses:
A. G. GOODSPEED,
CHAS. MEADER.